(No Model.)

W. P. HYATT.
MACHINE FOR HARDENING SEAMLESS FELT BOOTS, SHOES, &c.

No. 332,659. Patented Dec. 15, 1885.

WITNESSES:
C. Neveux
C. Sedgwick

INVENTOR:
W. P. Hyatt
BY Munn & Co.
ATTORNEYS.

UNITED STATES PATENT OFFICE.

WALTER P. HYATT, OF MATTEAWAN, NEW YORK, ASSIGNOR TO THE NEW YORK FELTING COMPANY.

MACHINE FOR HARDENING SEAMLESS FELT BOOTS, SHOES, &c.

SPECIFICATION forming part of Letters Patent No. 332,659, dated December 15, 1885.

Application filed April 8, 1885. Serial No. 161,558. (No model.)

*To all whom it may concern:*

Be it known that I, WALTER P. HYATT, a citizen of the United States, residing at Matteawan, in the county of Dutchess and State of New York, have invented a new and useful Machine for Hardening Seamless Felt Boots, Shoes, and other Hollow Felt Articles, of which the following is a specification.

On or about March 6, 1885, I filed with the Commissioner of Patents application, specification, and claims for a method of manufacturing seamless felt slippers, shoes, and boots with seamless projecting soles for the resultant articles, and for certain other articles, as by reference thereto will more fully appear.

On or about March 20, 1885, I filed with the Commissioner of Patents application, specification, and claims for a seamless felt glove, mitten, and gauntlet, as by reference thereto will more fully appear.

Disclaimer is herein made to any claims embodied in either of the foregoing applications, and to any or all modifications of the hereinafter described machine or method employed in the manufacture of hats or hat-bodies.

The object of my invention is to provide a new and improved machine for hardening seamless felt boots, shoes, and other hollow felt articles in such a manner that no subsequent stitching, finishing, felting, or hardening is required for firmly uniting the ends of the bat to complete the article.

Reference is to be had to the accompanying drawings, forming a part of this specification, in which similar letters of reference indicate corresponding parts in all the figures.

Figure 1:
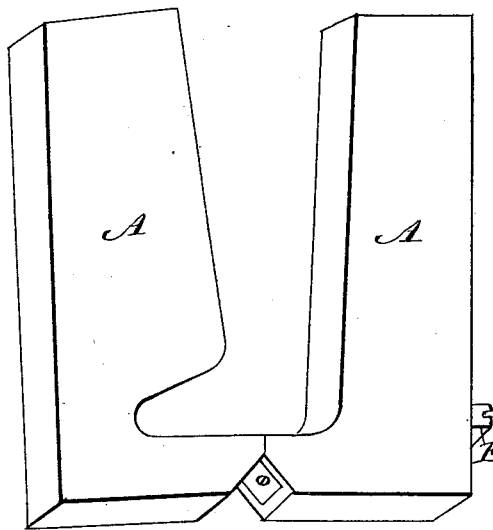
Figure 3:
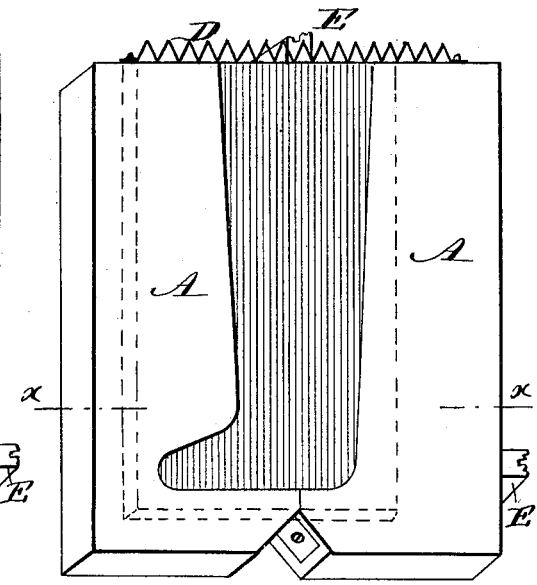
Figure 2:
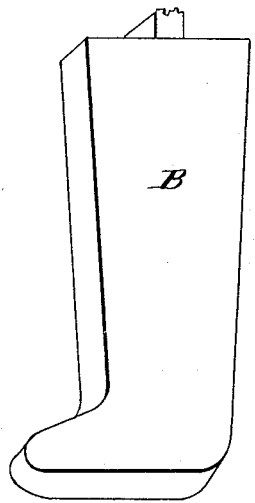
Figure 4:
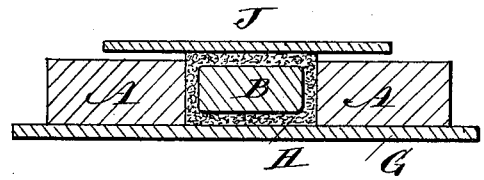
Figure 5:
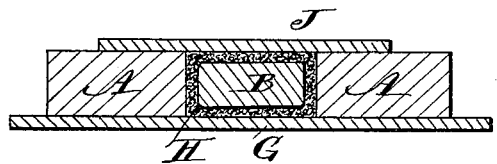

Figure 1 is a perspective view of the mold of my improved machine for hardening felt articles. Fig. 2 is a perspective view of the core. Fig. 3 is a face view of the mold and the core. Figs. 4 and 5 are cross-sectional elevations of the machine on the line $x$ $x$, Fig. 3, before and after hardening the felt article in the machine.

The mold is formed of two blocks, A, of wood or metal, the inner edges of which are recessed or cut out to form a recess having the shape of a boot. The core B, having the shape of a boot, is also made of wood or metal, and is smaller than the recess between the sections of the mold, and has less thickness than the mold. The mold and core may be made hollow and perforated to admit steam, which acts on the bat and facilitates the hardening. The mold and core are covered with burlap. The thickness of the mold varies according to the size and circumference or diameter of the article to be produced. The sections of the mold are hinged and pressed together by springs D, secured to the swinging or free ends.

Lugs E are secured to the mold and core, for attaching jiggers for vibrating the core and mold when necessary.

The mold may be made solid, if desired—that is, the two sections A may be rigidly united.

In making the felt article the mold is placed upon a suitable table or support, G. A bat, H, of wool, from two to three or four inches thick is placed in the mold, the core C is placed on the bat, and the bat lapped over on the top of the core, and another bat placed upon the core, the hardening-board J, placed on top of the mold and core, and the mold, core, and hardening-board are vibrated or operated to harden the bat. The hardening requires more or less time, according to the thickness of the bats.

After the article has been hardened it is removed from the mold, the core is removed from the article, and the article completed in the pusher or mills, and finished in the usual manner.

The edges of the bats are firmly and securely united by the hardening process, and no stitching, &c., is required.

Heretofore a vibrating shoe of the shape of a fish's tail was vibrated on the bat and the edges of the bat stitched together, and over the line of junction another bat of wool was placed and hardened. This makes the joint-boot unsightly, and gives unsightly and imperfect joints. Any other felt articles can be made in a machine of my improved construction, as set forth.

The hardening-board may be made smooth on its under side or may have a projection of the shape of the core.

Having thus described my invention, I claim as new and desire to secure by Letters Patent—

1. In a machine for hardening felt boots and shoes, the combination, with a mold formed of two sections hinged together at the ends, and swinging from each other in the planes of said sections, which sections have their inner edges recessed to form a recess or cavity having a shape approaching that of a boot, of a core having a shape similar to that of the recess or cavity, which core can be placed into said recess or cavity, substantially as herein shown and described.

2. In a machine for hardening felt boots and shoes, the combination, with a mold formed of two sections, hinged to each other, in which sections a cavity of a shape approaching that of a boot or shoe is formed, of a vibrating core in said mold, substantially as herein shown and described.

3. The combination, with the hinged mold-sections A, of the core B and the spring D, for pressing the mold-sections against the core, substantially as herein shown and described.

4. In a machine for hardening felt articles, the combination, with a mold having a recess, of a core which can be placed into the said recess, and of a hardening-board on the mold and core, substantially as herein shown and described.

WALTER P. HYATT.

Witnesses:
  HENRY G. WOLCOTT,
  CHARLES M. WOLCOTT.